United States Patent [19]

Ashley

[11] 4,327,406
[45] Apr. 27, 1982

[54] DC TO AC SYNTHESIZER WITH INVERTER CIRCUIT FAILURE AVOIDANCE

[75] Inventor: Albert H. Ashley, Holliston, Mass.

[73] Assignee: The United States of America as represented by the Secretary of the Army, Washington, D.C.

[21] Appl. No.: 193,332

[22] Filed: Oct. 1, 1980

[51] Int. Cl.³ .......................................... H02H 7/122
[52] U.S. Cl. ........................................ 363/56; 361/18
[58] Field of Search ...................... 361/18, 88, 90–93, 361/100; 363/55–58

[56] References Cited

U.S. PATENT DOCUMENTS

| | | | |
|---|---|---|---|
| 3,816,810 | 6/1974 | Friedman et al. | 363/56 X |
| 4,127,894 | 11/1978 | Bishop et al. | 363/56 |
| 4,293,888 | 10/1981 | McCarty | 361/100 X |

Primary Examiner—A. D. Pellinen
Attorney, Agent, or Firm—Nathan Edelberg; Jeremiah G. Murray; Michael C. Sachs

[57] ABSTRACT

The A.C. synthesizer is a unit developing several hundred watts at 60 Hz by pulse-width modulation techniques, with an 8 KHz sawtooth oscillator modulating a 60 Hz reference. Several failure modes common to electronic equipment caused the output stages designed for a pulse rate of 8 KHz to experience inputs from 60 Hz to as low as D.C., which inputs destroy expensive transistors. The addition of a retriggerable "one-shot" (monostable multivibrator) to inhibit the pulse width modulator output if not retriggered each 8 KHz cycle eliminates the catastrophic effect of most failure modes, allowing the output stage to reject low frequency pulses.

2 Claims, 2 Drawing Figures

DC TO AC SYNTHESIZER WITH INVERTER CIRCUIT FAILURE AVOIDANCE

The invention described herein may be manufactured and used by or for the Government for governmental purposes without the payment of any royalties thereon or therefor.

BACKGROUND OF THE INVENTION

This invention relates to protection of high power switching transistors in a D.C.-A.C. inverter of the type in which the on-off control signal to the transistors is modulated at a relatively high frequency combined with the 60 Hertz frequency.

In this type of inverter, using a "quad" of four transistors in a bridge configuration, failure of certain components in the control circuits could cause millisecond instead of microsecond pulses to be applied to the power transistors, causing current to build up to levels far in excess of their rating.

SUMMARY OF THE INVENTION

The object of the invention is to protect the inverter output transistors in case of failure which would produce abnormally long control pulses.

In accordance with the invention, a monostable device is added to the control circuits, with a period a little longer than that of the high frequency modulation, the monostable device being normally reset by the high frequency signals every cycle so that it has no effect on the output. In case of a failure causing loss of the high frequency modulation, the monostable device will time out, and block the output.

DETAILED DESCRIPTION

Figure 1:
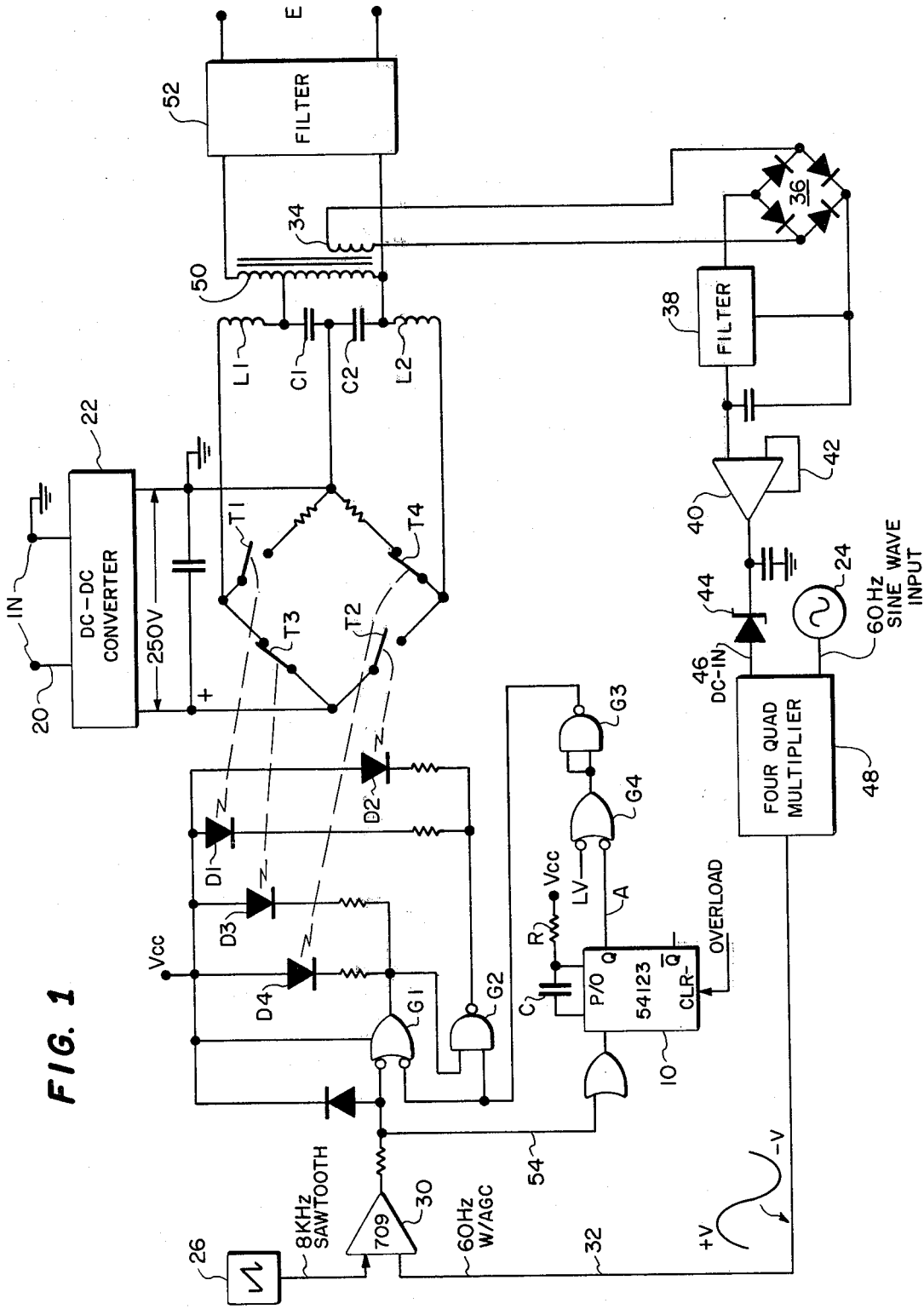
FIG. 1 is a block and schematic diagram (partly symbolic) of an inverter system, with the monostable device for protection added thereto.

The A.C. synthesizer or inverter shown in FIG. 1 develops 115 volts at 60 Hertz from a basic 28-volt direct current battery bus. Several possible failure mechanisms can cause loss of the 8 kiloHertz modulation of the 60 Hertz output, leading to destruction of the sensitive output transistors in a matter of milliseconds. The addition of a retriggerable "one-shot" (i.e., monostable multivibrator) 10 to the circuit eliminates the catastrophic effect of most failure modes, allowing the output stage to reject low frequency pulses.

The A.C. inverter is a sophisticated unit developing 60 Hertz by pulse-width modulation techniques, with an 8 kiloHertz sawtooth oscillator modulating an internally generated 60 Hertz reference. Several failure modes common to electronics equipment (e.g. loss of 8 KHz, failure of any part of the AGC circuitry consisting of a rectifier, 723 amplifier, 1594 four-quadrant multiplier, or output failure of 709 amplifier used as a comparator) would and did cause the output stages, designed for a pulse rate of 8 KHz, to experience inputs from 60 Hz to as low as D.C., either of which predictably destroys one or more of the twelve transistors. The first failure to pass low temperature tests for example occurred when the 60 Hz component drifted rapidly in amplitude, causing the 60 Hz component to predominate at the output and destroy one or more transistors.

The basic function of the D.C.-A.C. inverter is to develop several hundred watts of 60-Hertz power at 115 volts from a bus 20 which is at 21-30 volts D.C. By means of a conventional D.C.-D.C. converter 22 there is developed a high voltage direct current (+250 volts isolated from systems ground from the input direct-current source, as well as several isolated bias voltages (±6 V., ±15 V.).

The 60 Hz A.C. is developed by a pulse-width modulation technique. A low level 60 Hz oscillator 24 generates a relatively pure sine wave of fixed amplitude. A second oscillator 26 generates a linear ramp at a repetition rate of approximately 8 KHz, which is applied at fixed amplitude to one input of an operational amplifier 30, type 709, used as a comparator. The other input receives the 60 Hz reference signal on lead 32 at an amplitude controlled by the product of the 60 Hz input signal from oscillator 24, and a D.C. level at lead 46 resulting from the feedback of a portion of the 60 Hz output, as sampled by a transformer winding 34. This A.C. feedback signal is passed through a four-diode bridge rectifier 36 having an output filter 38. The resulting D.C. signal is passed through an amplifier 40, type 723, and a Zener diode 44, via lead 46 to an input of the four quadrant multiplier 48, type 1594. Lead 42 is a reference for amplifier 40. Amplifier 40 has a linear gain K with respect to the A.C. feedback signal amplitude.

The pulse width modulation is applied via optical isolators to "Quad" transistor switches shown in FIG. 1 as T1, T2 and T3, T4, forming the four arms of a bridge configuration. The switch in each arm comprises three parallel power transistors, typically type SVT6002. The high voltage D.C. power from converter 22 is applied across one diagonal of the bridge configuration, and the A.C. output is derived in the other diagonal. The output diagonal circuit comprises inductors L1 and L2 of 500 microhenries each, in series respectively with capacitors C1 and C2 of 60 microfarads each to the return of the high voltage D.C., shown symbolically as ground. An output autotransformer 50 has its primary section connected across the capacitors C1 and C2.

Of the optical isolators, only the light emitting diodes D1, D2, D3 and D4 are shown in FIG. 1. As is well known, the isolators also include light detectors, which with the remainder of the input circuits to the base electrodes for the transistors are represented by dashed lines to the switches T1, T2, T3 and T4. The circuit arrangement is such that whenever a light emitting diode has a forward voltage applied thereto, the corresponding transistor switch is brought to the ON or conducting state (switch closed), and otherwise the transistor switch is OFF (switch opened). The optical isolators may be type 6N136 (Formerly HP5082-4351).

The gates G1–G4 are on a type 5437 chip. The logic uses a positive voltage Vcc as the high or "1" state, and ground as the low or "0" state. For normal operation, the output of gate G3 must be high, which requires that the signals at points LV and A at the input of gate G4 be high. When the output of comparator 30 is high, gate G1 inverts the signal to low, to thereby cause the diodes D3 and D4 to conduct and turn on switches T3 and T4. Gate G2 inverts the output of gate G1, so that when the comparator output is high, diodes D1 and D2 are nonconducting. When the output of comparator 30 is low, diodes D3 and D4 are non-conducting, diodes D1 and D2 are conducting, and switches T1 and T2 are turned on.

When power is first applied, for several seconds the D.C. level at input 46 to the four quadrant multiplier 48 is zero, and an 8 KHz square wave of approximately 50% duty cycle is applied via the optical isolators and the "Quad" transistor switches T1, T2, T3, T4 (average amplitude of the 8 KHz output equal to zero). When the Zener threshold to the multiplier 48 is exceeded, a slowly increasing amplitude 60 Hz signal is applied to the comparator 30. A slight overshoot can be expected as the output of the demodulator attains the predetermined amplitude and generates a feedback voltage to regulate the A.C. amplitude.

Figure 2:
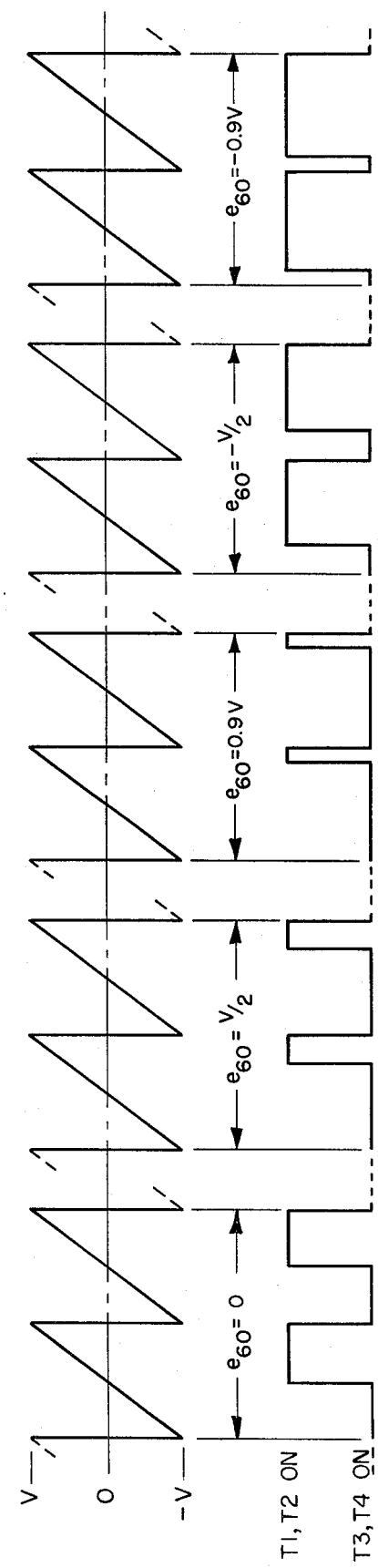
FIG. 2 is a graphic showing of the normal operation of the inverter.

The timing diagram of FIG. 2 shows how the inputs to the "Quad" switches vary pulse width at a 60 Hz rate. At 8 KHz, each pulse interval of the sawtooth wave has a duration of 125 microseconds. At 60 Hz, each cycle has a duration of more than 16 milliseconds, or 16,667 microseconds. Thus there are about 133 sawtooth intervals per 60 Hz cycle. As shown by a graph adjacent lead 32 in FIG. 1, the 60 Hz input to the comparator 30 has an instantaneous voltage which normally varies between $+V$ and $-V$. At the start of each sawtooth interval, the output of the comparator 30 is low so that switches T1, T2 are on and switches T3, T43 are off. At some point during the 125-microsecond interval of the sawtooth, the comparator is triggered to the high state to turn switches T1, T2 off and switches T3, T43 on. At each zero crossing of the 60 Hz sine wave, the comparator is triggered at the midpoint of the sawtooth, giving a 50% duty cycle for the pulse width modulation. As the sine wave increases toward $+V$, the triggering occurs later in each sawtooth, which decreases the pulse width high interval at the comparator output. When the sine wave reaches $+V/2$, the triggering occurs at the $\frac{3}{4}$ point of the sawtooth inverval. At $+0.9$ V the triggering is very near to the end of the sawtooth interval. As the sine wave passes through its peak and decreases, the pulse width increases to 50% at the next zero crossing, and continues to increase in duration. At $-V/2$, the triggering occurs at the $\frac{1}{4}$ point of the sawtooth interval. At $-0.9$ V the triggering is very near to the start of the sawtooth.

The two networks L1-C1 and L2-C2 shown in FIG. 1 serve to isolate the 250-volt rectangular pulses from the output autotransformer 50. Therefore across each of capacitors C1, C2 there appears the 8 KHz average voltage impressed upon the demodulator, which changes in amplitude at the 60 Hz rate. The output transformer 50 is isolated from the load by another filter 52 which removes the 8 KHz component.

Failure of certain components, as previously mentioned, could cause pulses measured in milliseconds instead of microseconds to be applied to the "quad" switches T1-T4. Current builds up at the rate of:

$$e/L = di/dt = 250 \text{ V}/0.005 = 0.5 \text{ A/u sec.}$$

In 40 microseconds, close to the normal maximum, the current reaches 20 amperes.

The solution for protecting the output transistors is the addition of monostable multivibrator 10, which is a retriggerable one shot type 54123. On the original pulse width modulation printed circuit card, the line OVERLOAD was connected directly to point A at the input of gate G4, so that a ground applied from outside the card holds both gates G1 and G2 in the ONE (high) state, removing current from the optical isolator diodes D1 through D4 to shut down the high power output stage. The one-shot period, determined by resistor R and capacitor C, is chosen to be slightly more than the 125 microseconds of a full 8 KHz cycle in the worst case. In normal operation the first 8 KHz pulse via lead 54 sets the Q-output of one shot 10 high and operation proceeds as before. The overload function is preserved by connecting the line to the "clear" input as shown so that a ground signal drives the Q-output unconditionally to ZERO.

In a fault condition resulting in a predominant 60 Hz (16 msec) output at the output of comparator 30, the leading edge sets the Q-output high for approximately 200 microseconds, during which time the power output stages are driven only twice as long as they would be driven in a normal (no fault) condition. At the end of the time-out, the Q-output to point A drops to ZERO and both gates G1 and G2 are inhibited to maintain their outputs high so that the output drivers are held OFF, preventing loss of expensive and mechanically hard to replace power transistors in the switchhes T1 through T4. Trouble shooting can then be confined to the plug-in cards causing the fault condition.

What is claimed is:

1. A D.C. to A.C. synthesizer system comprising a pulse width modulation device having a first high frequency sawtooth signal source wherein the sawtooth waveform comprises repetitive ramp signals rising from a lower to higher level at the start and close of an interval respectively, a second, lower frequency sinusoid signal source wherein its levels are between the levels of the said lower and higher levels of the said first signal source, a comparator device having the said first and second sources as inputs and having an output which is normally at a first logic value at the beginning of each said interval and changing to a second logic value when the first and second signals are equal, so that the pulse width at the output is representative of the amplitude of the second signal during each interval, and gate means coupled to said comparator output to supply the pulse width modulation to a DC-AC inverter means to convert direct current power to alternating current power at said lower second source frequency by demodulating said pulse width modulation which includes first high power solid state device switching means which in normal operation is "on" in response to said first logic value from the comparator and "off" in response to said second logic value; and second high power solid state device switching means which in normal operation is "on" in response to said second logic value and is "off" in response to said first logic value from the comparator; an inhibit of the gate means causes both the first and the second switching means to be "off", including means for protecting the components of said DC-AC inverter means from excessive power including monostable device having an input coupled to said output of the comparator, the monostable device having a timing period greater than said interval of the first signal, and being set by the leading edge of the comparator output and reset at the end of said timing period, the monostable device having an output coupled to said gate means to enable the gate means when it is in the set state and to inhibit the gate means when it is in the reset state to block the pulse width modulation and to maintain the signal to the inverter means in a safe state, whereby the monostable device remains normally in the set state and changes to the reset state upon failure of the output of the comparator to have a leading edge during said timing period and further including an overload line connected to a "clear" input of said monostable device, so that in response to an overload signal on said line the monostable device is held in its reset state to thereby inhibit said gate means.

2. The system of claim 1 wherein frequency of the said first signal source is approximately 8 KHZ and frequency of the said second signal source is approximately 60 HZ.

* * * * *